C. T. BRAY.
SLAG BRICK MACHINE.
APPLICATION FILED AUG. 5, 1920.
1,420,018.
Patented June 20, 1922.
6 SHEETS—SHEET 1.
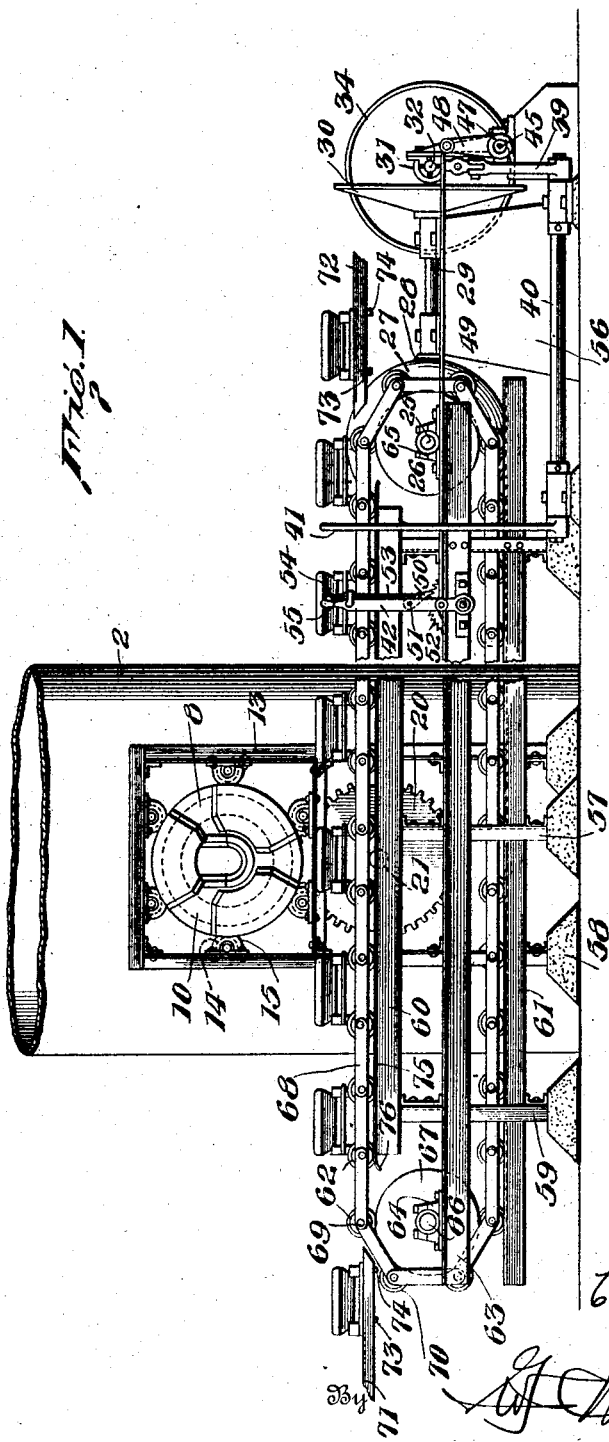

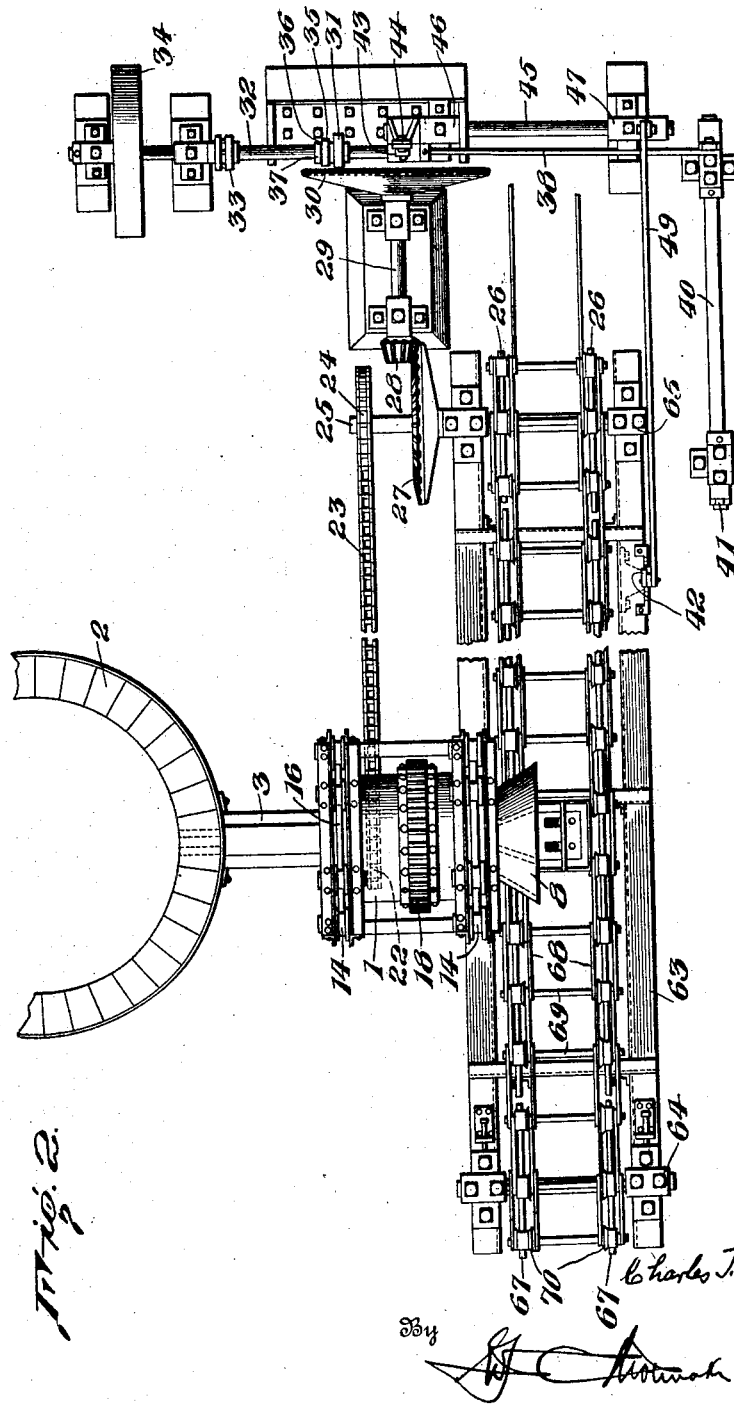

C. T. BRAY.
SLAG BRICK MACHINE.
APPLICATION FILED AUG. 5, 1920.
1,420,018.
Patented June 20, 1922.
6 SHEETS—SHEET 3.
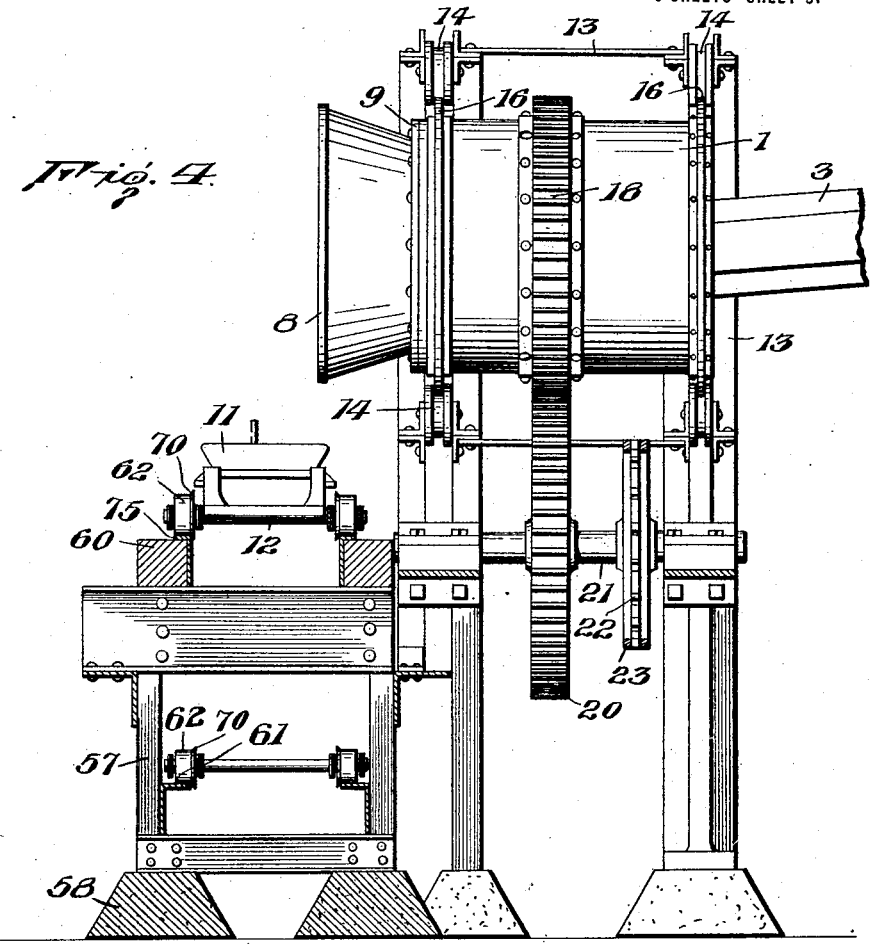
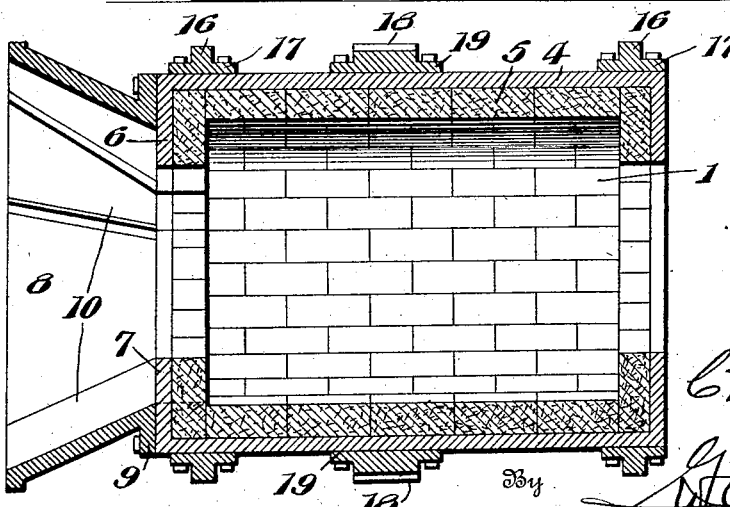
Inventor
Charles T. Bray
By
Attorney

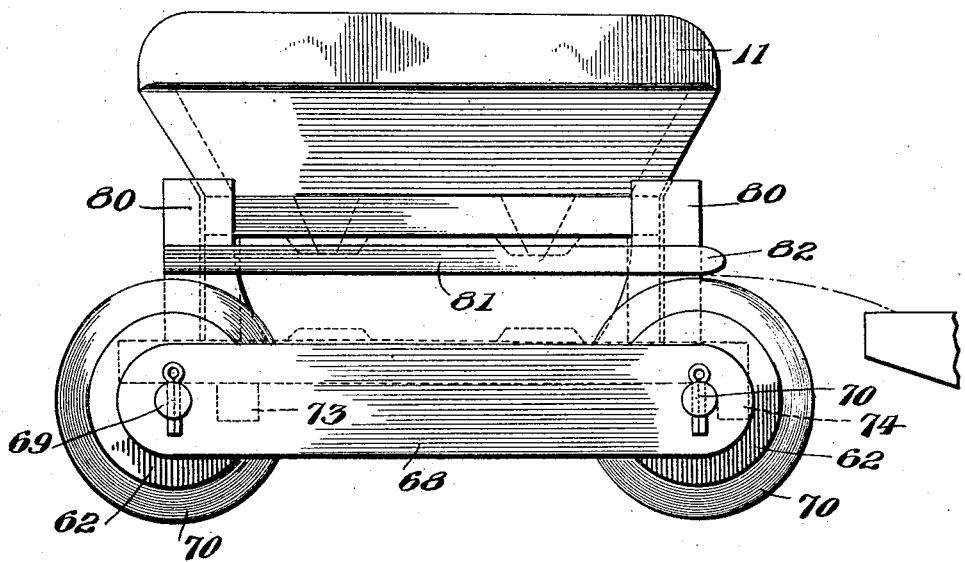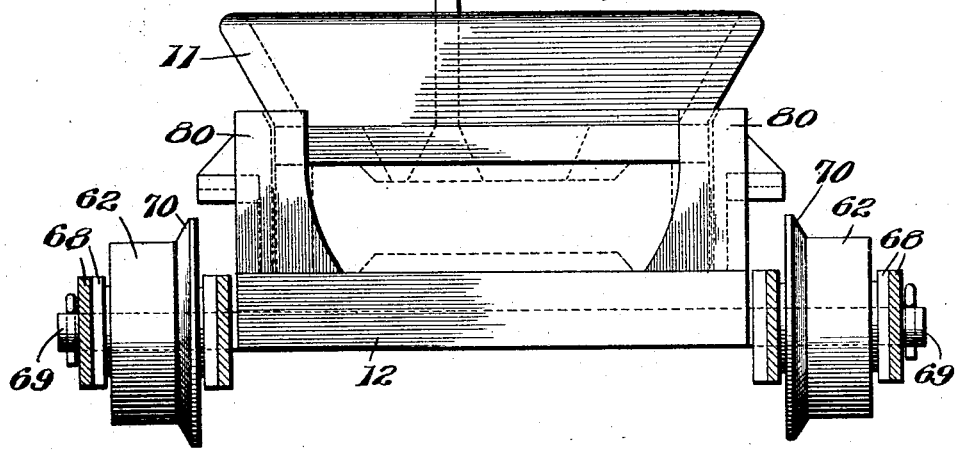

C. T. BRAY.
SLAG BRICK MACHINE.
APPLICATION FILED AUG. 5, 1920.
1,420,018.
Patented June 20, 1922.
6 SHEETS—SHEET 5.
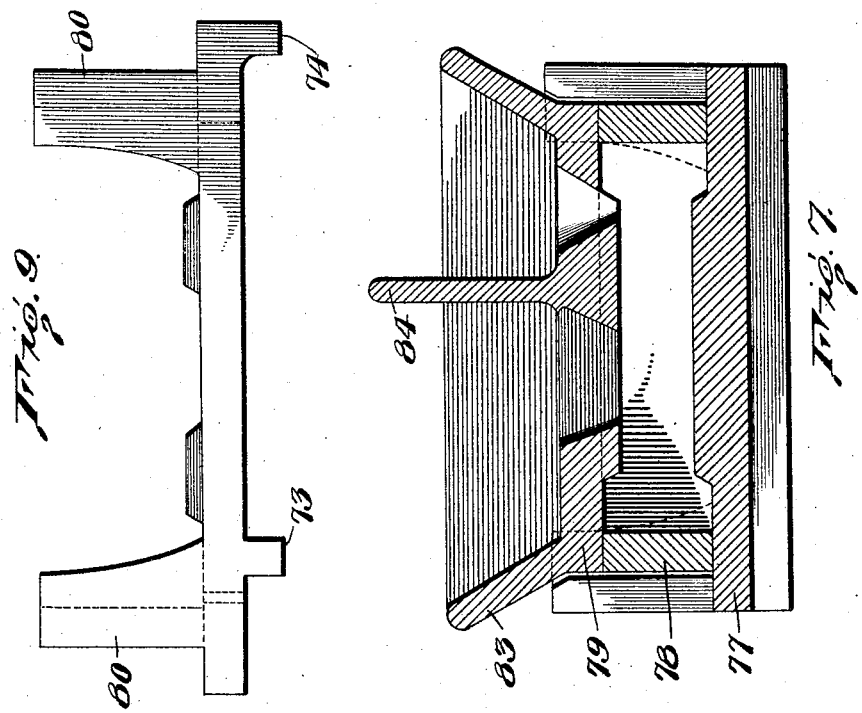
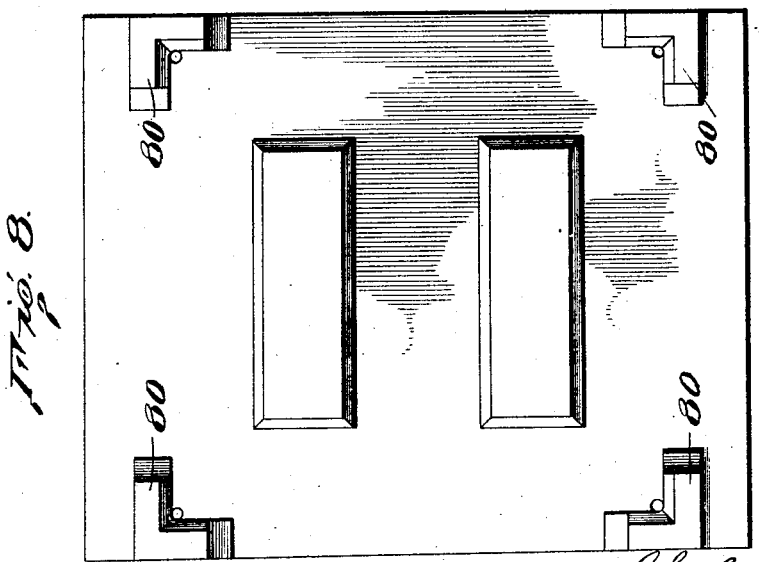
Inventor
Charles T. Bray
By
Attorney C. T. BRAY.
SLAG BRICK MACHINE.
APPLICATION FILED AUG. 5, 1920.
1,420,018.
Patented June 20, 1922.
6 SHEETS—SHEET 6.
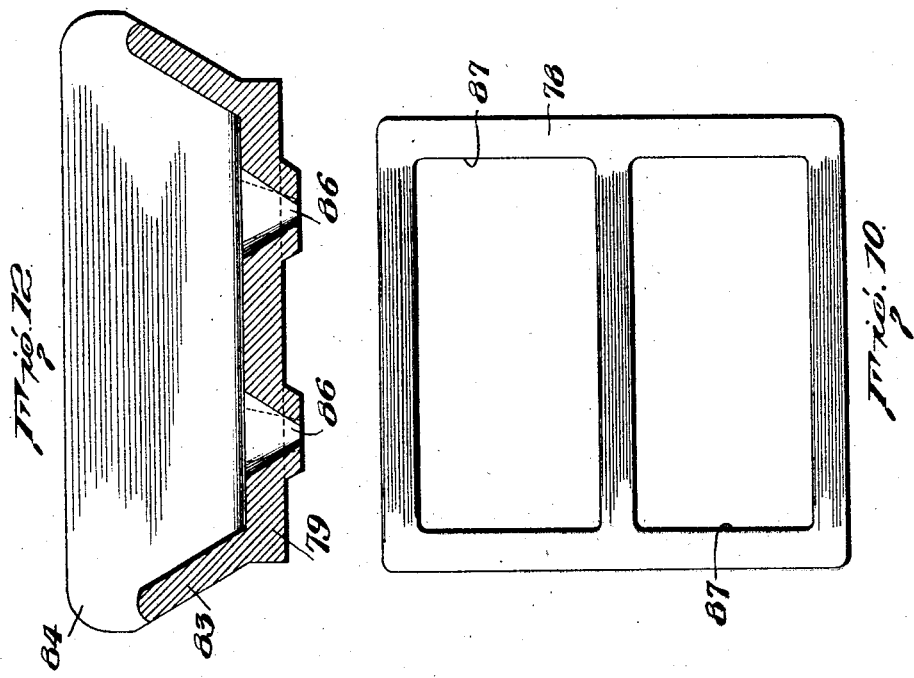
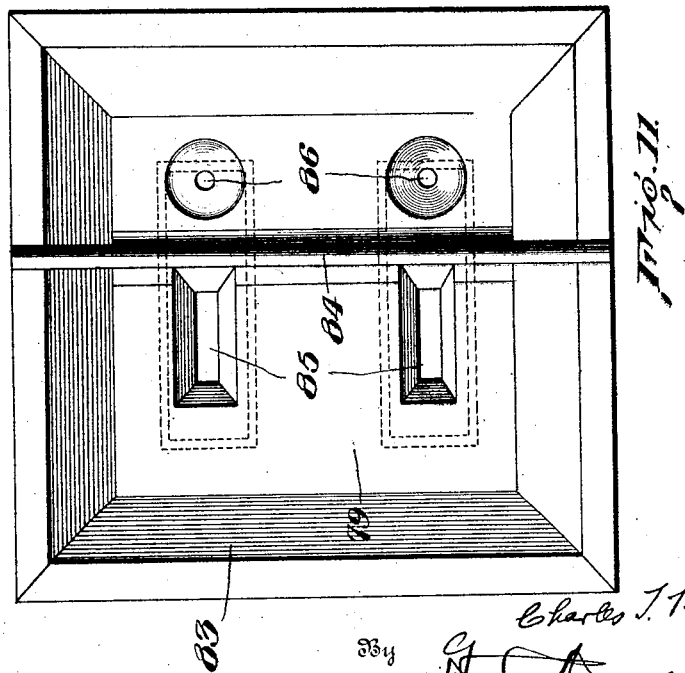
Inventor
Charles T. Bray
By
Attorney

UNITED STATES PATENT OFFICE.

CHARLES T. BRAY, OF SALT LAKE CITY, UTAH.

SLAG-BRICK MACHINE.

1,420,018.   Specification of Letters Patent.   Patented June 20, 1922.

Application filed August 5, 1920. Serial No. 401,316.

*To all whom it may concern:*

Be it known that I, CHARLES T. BRAY, a citizen of the United States, residing at Salt Lake City, in the county of Salt Lake and State of Utah, have invented new and useful Improvements in Slag-Brick Machines, of which the following is a specification.

The invention relates to a slag brick machine.

The object of the present invention is to provide a simple, practical and efficient slag brick machine of strong, durable and comparatively inexpensive construction adapted to receive the slag from a furnace and equipped with means for delivering the slag to molds and for operating the distributing means and mold conveying means in synchronism and for varying the speed of the distributing means and the mold conveying means to suit the flow of the slag so that the proper amount of slag will be delivered to the molds and perfect bricks molded.

With these and other objects in view, the invention consists in the construction and novel combination of parts hereinafter fully described, illustrated in the accompanying drawings and points out in the claims hereto appended, it being understood that various changes in the form, proportion, size and minor details of construction, within the scope of the appended claims, may be resorted to without departing from the spirit of the invention or sacrificing any of the advantages thereof.

In the accompanying drawings, in which like numerals of reference designate corresponding parts in the several figures:—

Figure 1 is a side elevation of a slag brick machine constructed in accordance with this invention and shown applied to a furnace.

Figure 2 is a plan view of the same.

Figure 3 is a transverse sectional view taken centrally of the rotary slag distributor.

Figure 4 is a side elevation of the rotary slag distributor.

Figure 5 is an enlarged side elevation of one of the molds and a portion of the mold conveyor.

Figure 6 is an enlarged end elevation of one of the molds and a portion of the mold conveyor.

Figure 7 is a transverse sectional view of one of the molds.

Figure 8 is a plan view of the flask portion of the mold.

Figure 9 is a side elevation of the same.

Figure 10 is a plan view of the two brick form of the mold.

Figure 11 is a plan view of the cover portion of the mold.

Figure 12 is a longitudinal sectional view of the cover portion of the mold taken through the vent openings.

In the accompanying drawings in which is illustrated the preferred embodiment of the invention, the slag brick molding machine comprises in its construction a rotary distributor 1 of cylindrical form arranged horizontally adjacent to a furnace 2 having the slag outlet 3 thereof discharging into the inner or rear end of the rotary distributor. The rotary distributor 1 which may be constructed of any suitable material preferably consists of a cast iron outer shell 4 and an inner lining 5 of fire brick or other suitable material. The outer cylindrical shell is provided with annular front and rear end flanges 6 and 7 forming circular openings and the lining 5 is arranged at the interior of the shell and the end flanges thereof as clearly illustrated in Figure 3 of the drawings. The rotary distributor is equipped at the front with a spillway cone 8 arranged horizontally and preferably consists of a casting provided at its inner reduced end with a vertical attaching flange 9 fitted against the front or outer end of the shell 4 and secured to the same by screws, bolts or other suitable fastening devices. The spillway cone is provided with a plurality of discharge channels or spillways 10 preferably three in number and arranged to deliver the slag to molds 11 of a mold conveyor 12 which is operated in synchonism with the rotary distributor and the speed of the rotary distributor and the mold conveyor is controlled by the means hereinafter described to regulate the speed of the machine to the feed or flow of the slag from the furnace. The end flanges and the lining of the rotary distributor form walls for causing an intermittent flow of molten slag from the rotary distributor, the slag being delivered by the rotary distributor to the molds through the bottom spillway. As the distributor 1 rotates, the spillways are successively carried to the bottom of the distributor and when they reach the bottom of the distributor they discharge into molds which are successively brought to the said distributor and the flow of the slag is cut off by the upward movement of the spillways from the bottom of the distributor. By this construction an automatic alternate feed of the slag to the molds of the conveyor is effected.

The rotary distributor is mounted in a bearing frame 15 provided with front and rear sets of grooved rollers 14 journaled in suitable bearings 15 and receiving roller trunnion rings 16 mounted on the rotary distributor at the front and rear or inner and outer portions thereof as clearly shown in Figure 4. The trunnion rings are provided with central bearing portions and side attaching portions 17 which are bolted or otherwise secured to the cast iron shell of the rotary distributor. Any number of grooved rollers may of course be employed and they support the rotary distributor in a horizontal position and permit free rotation of the distributor with a minimum amount of friction.

The rotary distributor is also equipped with a gear ring 18 constituting a gear element and mounted on the cast iron shell or casing of the distributor centrally of the same and provided with side attaching flanges 19 bolted or otherwise secured to the cast iron shell or casing of the distributor similar to the roller trunnion rings. The gear ring or element 18 meshes with a vertical gear wheel 20 located centrally beneath the distributor and mounted on a shaft 21 journaled in suitable bearings and disposed transversely of the conveyor at the inner or rear side thereof as clearly illustrated in Figure 4 of the drawings. The shaft 21 has mounted on it a sprocket pinion 22, which is connected by a meshing sprocket chain 23 with a sprocket pinion 24. The sprocket pinion 24 is mounted on a transverse shaft 25 on which are also mounted spaced wheels 26 of one end of the mold conveyor whereby the rotary distributor and the conveyor are simultaneously operated when the transverse shaft 25 is rotated. The transverse shaft 25 has keyed or otherwise secured to it a vertical bevel gear wheel 27 which meshes with a bevel pinion 28 of a short longitudinal shaft 29. The shafts are journaled in suitable bearings and the short longitudinal shaft 29 carries, and suitably fixed to its outer end, a vertical friction wheel or disk 30 presenting a plane vertical face to an adjustable friction wheel or pinion 31 mounted on a transversely disposed driving or power shaft 32 and adapted to be shifted by the means hereinafter described to different points between the center and periphery of the disk or wheel 30 to vary the speed of the machine to suit the flow of slag from the furnace so that the molds will be properly charged and produce perfect bricks.

The driving shaft 32 which is provided with a flexible coupling 33 may receive its power from any suitable source and in the accompanying drawings a pulley 34 is shown mounted on the said shaft 33 to receive the belt from the motor or engine, but any other means may of course be employed for connecting the shaft 32 with the power.

The adjustable friction wheel or pinion 31 is engaged by a fork or member 35 operating in an annular groove 36 of a hub extension 37 of the friction wheel or pinion 31 in the usual manner and connected by a transverse rod 38 with an arm 39 of a rock shaft 40 which is provided with an operating arm or lever 41. The arm 39 is located at one end of the shaft 40 and the operating arm or lever 41 is located at the other end of the said shaft and the latter is journaled in suitable bearings and is of a length to arrange the operating arm or lever 41 adjacent a controlling or operating lever 42 which is connected with the shaft 32 for controlling the movement of the shaft for adjusting the friction wheel or pinion 31 with respect to the face of the friction disk or wheel to vary the engagement of the friction elements and also to separate the same for stopping the machine.

The operation of the shaft 32 on which the friction wheel or pinion is adjustable, is rendered flexible by the coupling 33 and the outer end thereof is journaled in a suitable bearing 43 which is carried by an arm 44 of a transverse rock shaft 45 mounted in suitable bearings 46 and 47 and provided at its outer end with an upwardly extending arm 48 which is connected by a longitudinal rod 49 with the controlling lever 42. The controlling lever 42 is provided with a pawl or dog 50 pivoted at 51 and engaging a toothed segment 52 and connected by a rod 53 with a latch lever 54 mounted on the controlling lever 42 adjacent to the upper end thereof at the handle or grip portion of the controlling lever and adapted to be operated simultaneously with the controlling lever. A spring 55 is interposed between the latch lever and the controlling lever 42 for maintaining the dog normally in engagement with the toothed segment. The shifting lever 41 for controlling the speed and the controlling lever 42 for starting and stopping the machine and for regulating the frictional engagement of the friction gear elements, are located adjacent each other and are adapted to be controlled by one operator.

The machine is preferably equipped with a concrete base 56 and the frame 57 of the mold conveyor 12 is preferably mounted on concrete foundations 58 and is equipped with vertical posts 59 and upper and lower tracks 60 and 61 arranged to receive the wheels 62 of the mold conveyor. The rails 60 and 61 are located at the upper and lower portions of the frame 57 and the latter is provided at opposite sides at an intermediate point between the rails with longitudinal side members 63 which have mounted on their terminal portions bearings 64 and 65 for the transverse shaft 25 and also for a transverse shaft 66 on which are mounted wheels 67 located at the opposite end of the conveyor to that at which the wheels 26 are arranged.

The mold conveyor comprises spaced endless roller chains located at opposite sides of the conveyor frame and composed of links 68, the said wheels 62 connected by transverse axles 69 extending across the conveyor being provided at their inner sides with flanges 70 which are arranged at the inner faces of the end wheels 26 and 67 but the rollers or wheels of the mold conveyor may be of any desired construction as may be readily understood and they ride upon the rails 60 and 61.

The molds 11 are feed to the mold conveyor from a front stationary track or way 71 and are carried by the conveyor past the spillway cone of the rotary distributor and after being filled with slag from the furnace are delivered by the mold conveyor onto a fixed track or way 72, the molds being provided with projecting bottom transverse portions or flanges 73 and 74 located at the front and rear portions of the mold and arranged to be engaged by the transverse shafts or axles 69. The front transverse flange or projection 73 of the mold is engaged by one of the shafts of the mold conveyor for feeding the mold onto the conveyor and the rear transverse flange or portion 70 is engaged by one of the transverse shafts of the mold conveyor in feeding the mold onto the guide or way 72. By this construction, the endless mold conveyor picks the molds from the guide or way 71 and delivers them onto the guide or way 72.

The upper track 60 is provided with bars or rails 75 which have extended terminals 76 curved downwardly to clear the rollers or wheels of the conveyor and to facilitate the guiding of the same onto the upper track of the upper flight or stretch of the mold conveyor as the wheels or rollers leave the upper rail. This construction extends the upper rails sufficiently to support the chain conveyors in feeding the filled molds onto the said guide or way 72. The lower tracks 61 are extended sufficiently to support the rollers or wheels until they leave the tracks in passing around the wheels 67 and they receive the rollers or wheels as soon as they reach the bottom of the wheels 26. The molds 11 comprise a flask bottom or section 77, a two brick form section 78 and a cover section 79. The flask section or portion is provided at the front and rear portions with the said transverse flanges 73 and 74 and is also provided with corner posts 80 and is equipped with longitudinal side flanges or member 81 having tapered front terminals 82 and adapted to rest upon the tracks or ways 71 and 72. The two brick form or section of the mold is arranged within the posts 80 which are approximately L-shape in horizontal section as shown and the cover section 79 also fits within the posts and is supported upon the form or section 78 and is provided at the top with flaring side and end flanges 83 and a partition 84. The flaring flanges form a tray or hopper to receive the molten slag and the cover section is provided with gate openings 85 and vent openings 86 located at the opposite sides of the partition 84 and communcating with the two mold chambers or compartments 87 of the two brick form or section 78.

While I have employed the term "brick" to designate the molded article, it will be readily understood that any form of block, tile, or the like is contemplated by the present invention and instead of using slag any molten material may be employed and handled by the molding machine.

What is claimed is:—

1. A slag brick machine including a movable distributor having end walls to form a bottom slag chamber adapted to receive slag from a furnace and provided with a plurality of slag spillways adapted to be carried successively to a point of discharge, and means for presenting a plurality of molds successively to the said point of discharge to receive slag from the distributor.

2. A slag brick machine including a rotary distributor adapted to receive slag from a furnace and provided with a plurality of slag spillways circumferentially spaced at one end of the distributer and adapted to be carried successively to a point of discharge, and means for successively presenting a plurality of molds to the said point of discharge to receive the slag.

3. A slag brick machine including a horizontal rotary distributor having an opening at one end to receive slag from a furnace and provided with a plurality of circumferentially spaced slag spillways located at the other end of the distributer and adapted to discharge at the bottom of the distributer, and means for successively presenting a plurality of molds to the distributor to receive the slag from the outlets or spillways.

4. A slag brick machine including a horizontal rotary distributer provided with circumferential end walls forming a bottom slag chamber, said distributer being provided at one end with an opening to receive slag from a furnace and having at the other end a plurality of circumferentially spaced outlets or spillways located above the interior bottom surface of the slag chamber of the distributer adapted to be brought successively to the bottom of the distributor for discharging slag therefrom, and means for successively presenting a plurality of molds in position to receive the slag from the distributor.

5. A slag brick machine including a horizontal rotary distributer adapted to receive slag from a furnace and provided at one end with a spillway cone having a plurality of circumferentially spaced outlets or spillways, and means for successively presenting a plurality of molds in position to receive the slag from the rotary distributor.

6. A slag brick machine including a horizontal rotary distributer provided at one end with an opening to receive slag from a furnace and having a spillway cone at the other end provided with a plurality of circumferentially spaced inclined spillway channels forming outlets and adapted to be successively brought to the bottom of the distributor for discharging the slag and means for successively presenting a plurality of molds in position to receive the slag from the distributor.

7. A slag brick machine including a horizontal rotary distributer adapted to receive slag from a furnace and consisting of an outer metallic cylindrical shell provided at its ends with annular flanges forming end openings, a lining of refractory material arranged within the said shell, and means secured to the shell at one end thereof for discharging the slag.

8. A slag brick machine including a horizontal rotary distributer adapted to receive slag from a furnace and consisting of an outer metallic cylindrical shell provided at its ends with annular flanges forming end openings, a lining of refractory material arranged within the said shell, and a metallic spillway cone secured to the shell at one end thereof and provided with a plurality of inclined spillway channels.

9. A slag brick machine including a horizontal rotary distributer adapted to receive slag from a furnace and provided with a plurality of circumferentially spaced outlets or spillways for the discharge of the slag, a trunnion ring surrounding the rotary distributer and having an attaching flange secured to the said distributer, and a bearing frame provided with spaced rollers receiving the trunnion ring and supporting the distributer for rotary movement.

10. A slag brick machine including a horizontal rotary distributer adapted to receive slag from a furnace and provided with spaced trunnion rings around the distributer at the ends thereof and secured to the said distributer, and a bearing frame surrounding the distributer and provided with sets of rollers receiving the trunnion rings and supporting the distributer for rotary movement.

11. A slag brick machine including a horizontal rotary distributer adapted to receive slag from a furnace and provided with a plurality of circumferentially spaced outlets, spaced rollers supporting the distributer, a gear ring mounted on the distributer, and means for rotating the distributor including a gear meshing with the said gearing ring.

12. A slag brick machine including a horizontal rotary distributer adapted to receive slag from a furnace and provided with a plurality of circumferentially spaced outlets, spaced trunnion rings mounted on the distributer, separate sets of rollers receiving the trunnion rings and supporting the distributer, a gear ring mounted on the distributer and located between the trunnion rings, and means including a gear meshing with the gear ring for rotating the distributor.

13. A slag brick machine including a rotary distributer provided with a plurality of outlets adapted to be successively brought to a point of discharge, an endless conveyor adapted to carry a plurality of molds successively to the said point of discharge to receive slag from the distributor, gearing connected with the rotary distributer and the conveyor for operating the same simultaneously, and means for varying the speed of the conveyor and the distributer to adjust the speed to the flow of the slag.

14. A slag brick machine including a horizontal rotary distributer provided at one end with an opening to receive slag from a furnace and having at the other end a plurality of circumferentially spaced outlets adapted to be successively brought to the bottom of the distributor for discharging the slag, an endless conveyor arranged to carry successively a plurality of molds beneath the discharging outlets, gearing connected with the conveyor and the rotary distributor, a friction disk connected with the said gearing for actuating the same, a drive shaft, and a friction wheel adjustable on the drive shaft and arranged to engage the friction disk.

15. A slag brick machine including a horizontal rotary distributor provided at one end with an opening to receive slag from a furnace and having at the other end a plurality of circumferentially spaced outlets adapted to be successively brought to the bottom of the distributor for discharging the slag, and endless conveyor arranged to carry successively a plurality of molds beneath the discharging outlets, gearing connected with the conveyor and the rotary distributor, a friction disk connected with the said gearing for actuating the same, a drive shaft having a flexible coupling, a friction wheel mounted on the drive shaft and arranged to engage the friction disk and adapted to be carried into and out of engagement with the same by the flexing of the drive shaft, and means for adjusting the friction wheel and the drive shaft.

16. A slag brick machine including a horizontal rotary distributor provided at one end with an opening to receive slag from a furnace and having at the other end a plurality of circumferentially spaced outlets adapted to be successively brought to the bottom of the distributor for discharging the slag, an endless conveyor arranged to carry successively a plurality of molds beneath the discharging outlets, gearing connected with the conveyor and the rotary distributor, a friction disk connected with the said gearing for actuating the same, a drive shaft having a flexible coupling, a friction wheel mounted on the drive shaft and arranged to engage the friction disk and adapted to be carried into and out of engagement with the same by the flexing of the drive shaft, means for adjusting the friction wheel, a rock shaft having an arm provided with a bearing receiving the drive shaft, and means for partially rotating the rock shaft to engage the friction wheel and to carry it out of such engagement and to vary the frictional engagement.

17. A slag brick machine including a horizontal rotary distributor provided at one end with an opening to receive slag from a furnace and having at the other end a plurality of circumferentially spaced outlets adapted to be successively brought to the bottom of the distributor for discharging the slag, an endless conveyor arranged to carry successively a plurality of molds beneath the discharging outlets, gearing connected with the conveyor and the rotary distributor, a friction disk connected with the said gearing for actuating the same, a drive shaft having a flexible coupling, a friction wheel mounted on the drive shaft and arranged to engage the friction disk and adapted to be carried into and out of engagement with the same by the flexing of the drive shaft, means for adjusting the friction wheel, a rock shaft having an arm provided with a bearing receiving the drive shaft, means for partially rotating the rock shaft to engage the friction wheel, said rock shaft being also provided with an operating arm, a controlling lever connected with the controlling arm, and means for locking the controlling lever.

18. A slag brick machine including a horizontal rotary distributor adapted to receive slag from the furnace and provided with a plurality of circumferentially spaced outlets, an endless conveyor adapted to successively carry a plurality of molds to the rotary distributor, a gear ring mounted on the rotary distributor, a gear meshing with the gear ring, a shaft connected with the conveyor, gearing connecting the shaft with the said gear, a longitudinal shaft, gearing connecting the said shafts, and driving means including a speed controlling device connected with the longitudinal shaft.

19. A slag brick machine including a horizontal rotary distributor having a plurality of outlets and provided with a gear ring, a gear meshing with the gear ring, a conveyor adapted to carry a plurality of molds successively to the distributor and having an extended transverse end shaft, sprocket gearing connecting the end shaft with the said gear, and means connected with the end shaft for operating the conveyor and the rotary distributor.

20. A slag brick machine including a horizontal rotary distributor provided with a plurality of circumferentially spaced outlets, a mold conveyor adapted to successively carry a plurality of molds to the rotary distributor and comprising spaced roller chains and connecting shafts, and means located in advance and in each of the conveyors for feeding molds to the conveyor and for receiving the filled molds.

21. A slag brick machine including a horizontal rotary distributor provided with a plurality of circumferentially spaced outlets, a mold conveyor adapted to successively carry a plurality of molds to the rotary distributor and comprising spaced roller chains and connecting shafts, said molds provided with front projecting portions adapted to be engaged by the shafts of the conveyor for feeding the molds onto the conveyor, said molds being also provided at the back with projecting portions adapted to be engaged by the shafts for discharging the molds from the conveyor.

22. A slag brick machine including a horizontal rotary distributor provided with a plurality of circumferentially spaced outlets, a mold conveyor adapted to successively carry a plurality of molds to the rotary distributor and comprising spaced roller chains and connecting shafts, said molds provided with front projecting portions adapted to be engaged by the shafts of the conveyor for feeding the molds onto the conveyor, said molds being also provided at the back with projecting portions adapted to be engaged by the shafts for discharging the molds from the conveyors, and means located in advance and in rear of the conveyor for supporting the molds.

23. A slag brick machine including a horizontal rotary distributor provided with a plurality of circumferentially spaced outlets, a plurality of molds, and a mold conveyor comprising a frame having upper and lower tracks, the lower tracks having extended terminals and the upper tracks being provided with curved terminal portions.

In testimony whereof I have hereunto affixed my signature.

CHARLES T. BRAY.